US007016496B2

(12) United States Patent
Koch (10) Patent No.: US 7,016,496 B2
(45) Date of Patent: Mar. 21, 2006

(54) SYSTEM AND METHOD FOR STORING AND ACCESSING DIGITAL MEDIA CONTENT USING SMART CARD TECHNOLOGY

(75) Inventor: Mark J. Koch, Westminster, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 788 days.

(21) Appl. No.: 09/817,631

(22) Filed: Mar. 26, 2001

(65) Prior Publication Data

US 2002/0138741 A1    Sep. 26, 2002

(51) Int. Cl.
*H04N 7/167*    (2006.01)
(52) U.S. Cl. ............... 380/239; 380/228; 380/278; 713/185
(58) Field of Classification Search ............... 713/153, 713/172, 185; 380/228, 237, 239, 278
See application file for complete search history.

(56) References Cited

U.S. PATENT DOCUMENTS

| 4,817,140 | A |   | 3/1989  | Chandra et al. ............. 380/4   |
| 4,908,834 | A | * | 3/1990  | Wiedemer ................. 380/228   |
| 5,237,610 | A | * | 8/1993  | Gammie et al. ............ 380/228   |
| 5,784,460 | A |   | 7/1998  | Blumenthal et al. ........... 380/4  |
| 5,991,399 | A |   | 11/1999 | Graunke et al. ............... 380/4 |
| 6,035,037 | A | * | 3/2000  | Chaney ..................... 380/227  |
| 6,055,314 | A | * | 4/2000  | Spies et al. ................ 380/228 |
| 6,298,441 | B1| * | 10/2001 | Handelman et al. ........ 713/185    |
| 6,499,103 | B1| * | 12/2002 | Tsuria et al. ................ 713/153 |

OTHER PUBLICATIONS

Description of Digital Audio-Visual Functionalities, 1998, Digital Audio-Visual Council, pp. 24-32.*

* cited by examiner

*Primary Examiner*—Gilberto Barron, Jr.
*Assistant Examiner*—Minh Dinh
(74) *Attorney, Agent, or Firm*—Lahive & Cockfield, LLP (57) ABSTRACT

A system and method for delivering digital media content to a user over a network is disclosed. The illustrative embodiment of the present invention enables multiple types of electronic devices to access the same digital media content for the same end user through the use of a smart card equipped with a license for the digital media content. Depending on the format of the digital media content, devices such as phones, pagers, internet appliances or PDAs can be used to present the digital media content to a user, as can traditional consumer electronic devices such as DVD players and VCRs. The encrypted content may be freely transferred and stored without copyright concerns since the decryption key is generated by the smart card containing the license.

4 Claims, 8 Drawing Sheets

SYSTEM AND METHOD FOR STORING AND ACCESSING DIGITAL MEDIA CONTENT USING SMART CARD TECHNOLOGY

TECHNICAL FIELD

The present invention relates generally to the downloading of digital media content over a network, and more particularly, to the downloading of encrypted digital media content over a network to an electronic device interfaced with a smart card equipped with a decryption key.

BACKGROUND OF THE INVENTION

Digital media content delivery systems are in a transition period. The traditional method of delivering digital media content to a user through the use of physical storage mediums, such as a DVD disc or VHS tape, is undergoing change. The newer model of delivery stresses offsite storage of digital media content with delivery of the digital media content directly to a user over the Internet or other communications network. The advent of broadband delivery systems capable of delivering digital media content is expected to hasten this trend. However, the delivery of digital media content in a virtual non-physical form to the end consumer causes a number of problems, including problems relating to copyright protection.

One of the problems caused by the delivery of digital media content over the Internet is that the end user of the digital media content does not have a tangible physical object to possess. This makes the marketing of the digital media content to the end consumer a more difficult proposition. Additionally, the delivery of digital media content over the Internet raises a number of issues regarding the subject of illegal use and illegal copying of the digital media content. If the digital media content being transferred over the Internet in not in encrypted form, it may be quickly copied and used by unintended recipients. If the digital media content is encrypted, the encryption key is confined to the electronic device receiving the digital media content and the digital media content therefore becomes restricted to being rendered on that device. Both issues are currently limiting the willingness of consumers to acquire digital media content over the Internet.

SUMMARY OF THE INVENTION

The present invention addresses the issues raised by the current methods of delivering digital media content over networks, such as the Internet. The illustrative embodiment of the present invention enables multiple types of electronic devices to access the same digital media content for the same end user through the use of a smart card equipped with a license for the digital media content. Depending on the format of the digital media content, devices such as phones, pagers, internet appliances or PDAs can be used to present the digital media content to a user, as can traditional consumer electronic devices such as DVD players and VCRs. The encrypted content may be freely transferred and stored without copyright concerns since the decryption key is generated by the smart card containing the license. The smart card acts as a physical token that can be physically transferred or sold. The illustrative embodiment of the present invention further provides additional presentation possibilities for certain types of digital media content over what would be available to an end user using traditional physical media storage. Specifically, the present invention allows the smart card to bookmark or set a reference point, at the point where a user stops accessing a stream of digital media content. The user is able to continue viewing the stream of digital media content from the point of the bookmark when the user subsequently accesses the stream of digital media content.

In one embodiment of the present invention, a method is practiced whereby digital media content is delivered over a network in encrypted form to an electronic device interfaced with a smart card. A cipher is extracted from the digital media content, combined with a session or electronic device produced cipher and forwarded to the smart card. The smart card generates a decryption key and forwards it to the electronic device. The electronic device takes the decryption key generated by the smart card and uses that key and an embedded key from the electronic device to decrypt the digital media content. The decrypted digital media content may then be presented to the user. The smart card monitors the location in the stream of digital media content being presented to the user and bookmarks the location where the stream stopped being presented to the user. The smart card thereafter enables access to the stream of digital media content at the bookmarked location.

In an alternative embodiment of the present invention, a method is practiced whereby digital media content is delivered over a network in encrypted form to an electronic device interfaced with a smart card. A cipher is extracted from the digital media content and forwarded to the smart card. The smart card generates a decryption key and forwards it to the electronic device. The electronic device takes the decryption key generated by the smart card and uses that key to decrypt the digital media content. The decrypted digital media content may then be presented to the user. The smart card monitors the location in the stream of digital media content being presented to the user and bookmarks the location where the stream stopped being presented to the user. The smart card thereafter enables access to the stream of digital media content at the bookmarked location.

In another embodiment of the present invention a second smart card is utilized. In this alternative embodiment digital media content is delivered over a network in encrypted form to an electronic device. A cipher is extracted from the digital media content and forwarded to the second smart card. The second smart card generates a new cipher in response to the original cipher and sends the new cipher to the first smart card. The first smart card generates a decryption key in response to the new cipher and forwards the decryption key to the electronic device. The second smart card also forwards a decryption key to the electronic device. The electronic device takes the two decryption keys generated by the smart cards and uses them as well as a decryption algorithm stored on the electronic device to decrypt the digital media content. The decrypted digital media content may then be presented to the user. The smart card monitors the location in the stream of digital media content being presented to the user and bookmarks the location where the stream stopped being presented to the user. The smart card thereafter enables access to the stream of digital media content at the bookmarked location.

In a separate embodiment of the present invention, a second smart card is also utilized. In this embodiment, digital media content is delivered over a network in encrypted form to an electronic device. A cipher is extracted from the digital media content and forwarded to the first smart card. The first smart card generates a decryption key in response to the cipher and forwards the decryption key to the electronic device. A cipher is extracted from the digital media content and forwarded to the second smart card. The second smart card generates a decryption key in response to the cipher and sends the decryption key to the electronic device. The electronic device takes the two decryption keys generated by the smart cards and uses them as well as a decryption algorithm stored on the electronic device to decrypt the digital media content. The decrypted digital media content may then be presented to the user. The smart card monitors the location in the stream of digital media content being presented to the user and bookmarks the location where the stream stopped being presented to the user. The smart card thereafter enables access to the stream of digital media content at the bookmarked location.

DETAILED DESCRIPTION OF THE INVENTION

The illustrative embodiments of the present invention enable multiple types of electronic devices to access the same digital media content for the same end user through the use of a smart card, hereafter referred to as "media card", equipped with a decryption key and license for the digital media content. Depending on the format of the digital media content devices, such as phones, pagers, internet appliances or PDAs can be used, as can traditional consumer electronic devices, such as DVD players and VCRs. The user is freed from having to view the digital media content on the original electronic device as is the case with conventional methods of viewing decrypted digital media data. A user possesses a media card containing a license which evidences the right of the user to use the digital media content. The media card acts as a physical token that can be physically transferred or sold along with the license and decryption key. The media card also allows a user to bookmark or set a reference point, at the point where a user stops accessing a stream of digital media content. The user is able to continue viewing the stream of digital media content from the point of the bookmark when the user subsequently accesses the stream of digital media content.

Figure 1A:
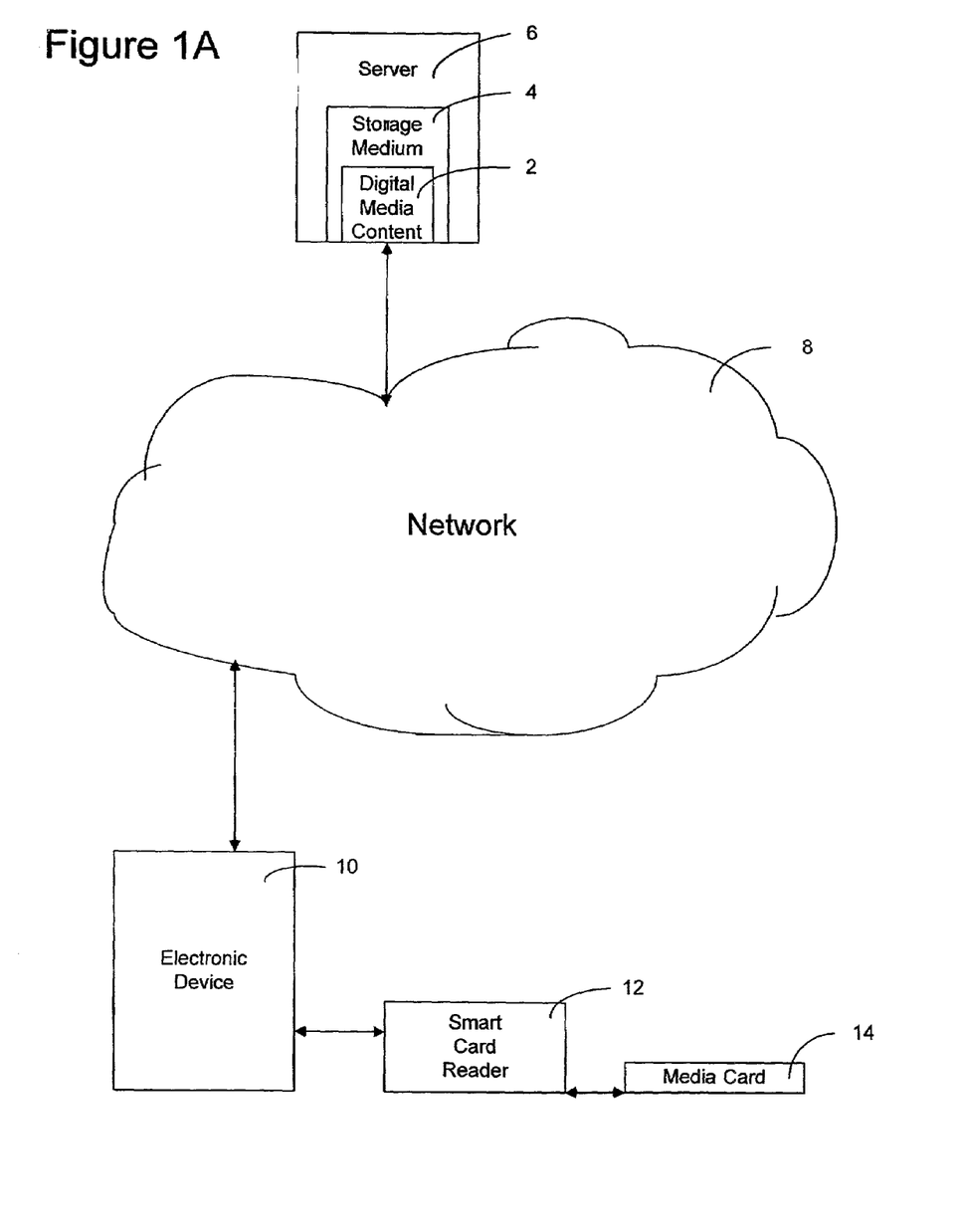
FIG. 1A is a block diagram depicting a network environment suitable for practicing the illustrative embodiment.

FIG. 1A depicts a network environment suitable for practicing the illustrative embodiment of the present invention. Digital media content 2 is stored on a storage medium 4. The storage medium 4 is located on a server 6 which is interfaced with the network 8 or other communication networks, such as wireless networks, proprietary computer networks, etc. An electronic device 10 with a network interface is connected to the network 8 and to a smart card reader 12. The smart card reader 12 contains a bay for the insertion of the media card 14. Those skilled in the art will realize that there are many possible network configurations that may be used in practicing the present invention.

The digital media content 2 may include, but is not limited to, audio files (such as a music CD), video files (such as a collection of graphical images), or it may be an audio-video files (such as a movie, typically found on a DVD or VHS tape). Other types of digital media content 2 include computer programming code, JavaScript, Java, HTML, etc. Additionally, the digital media content 2 may include large amounts of text data. The media card 14 used in the present invention is capable of being connected with a smart card reader 12 to any one of a number of different types of electronic devices 10. Because different types of electronic devices are capable of decrypting the digital media content stream, when using the decryption key, the same digital media content 2 may be presented to the user in many different ways. The digital media content 2 is sent out in encrypted form, it may be transferred from one electronic device 10 to another without concerns about copyright violations. Without the encryption key contained on the media card 14, the digital media content cannot be accessed.

The storage medium 4 contains different groups of digital media content 2 in encrypted form. By distributing digital media content over the Internet to end consumers, distributors of digital media content 2 are able to lower their distribution costs by not having to distribute digital media content in physical form. Additionally, since the digital media content 2 is encrypted, the distributor can distribute the content to anyone requesting the content from the server 6 without bothering to check if the requesting party is entitled to the digital media content. Anyone requesting the digital media content 2 without a decryption key will not be able to use the digital media content. Thus, the distributor of the digital media content 2 is able to focus on efficiently transmitting the information without bothering with any sort of verification of the requesting party.

The media card 14 is capable of tracking the current position in the stream of digital media content 2 being output by an electronic device 10. In the event the user is watching a movie through an electronic device 10 which is connected to the smart card reader 12 and the media card 14, and the user stops watching the movie prior to its ending, the place the user stops is bookmarked on the smart card. At a later time, the user can return, place the media card 14 back in the smart card reader 12 connected to the electronic device 10 and continue watching the movie from the marked place in the stream of digital media content 2. This ability to denote or bookmark a spot in the stream of digital media content 2, is an ability present in VHS tapes but not for instance in DVD videos. Alternatively, the user can return to a different electronic device 10, have the electronic device download the movie the user had previously been watching, and resume watching the movie at the same place where the user had previously left off watching the movie. The bookmark is portable from one electronic device to another. Additionally, a second software license and decryption key to a different group of digital media content may be purchased and downloaded to the media card 14. The bookmarks on the media card may keep track of different places in different streams of digital media content 2. In this manner, it is possible for multiple users to maintain bookmarks on the same media card 14 to the same or different groups of digital media content 2.

Figure 1B:
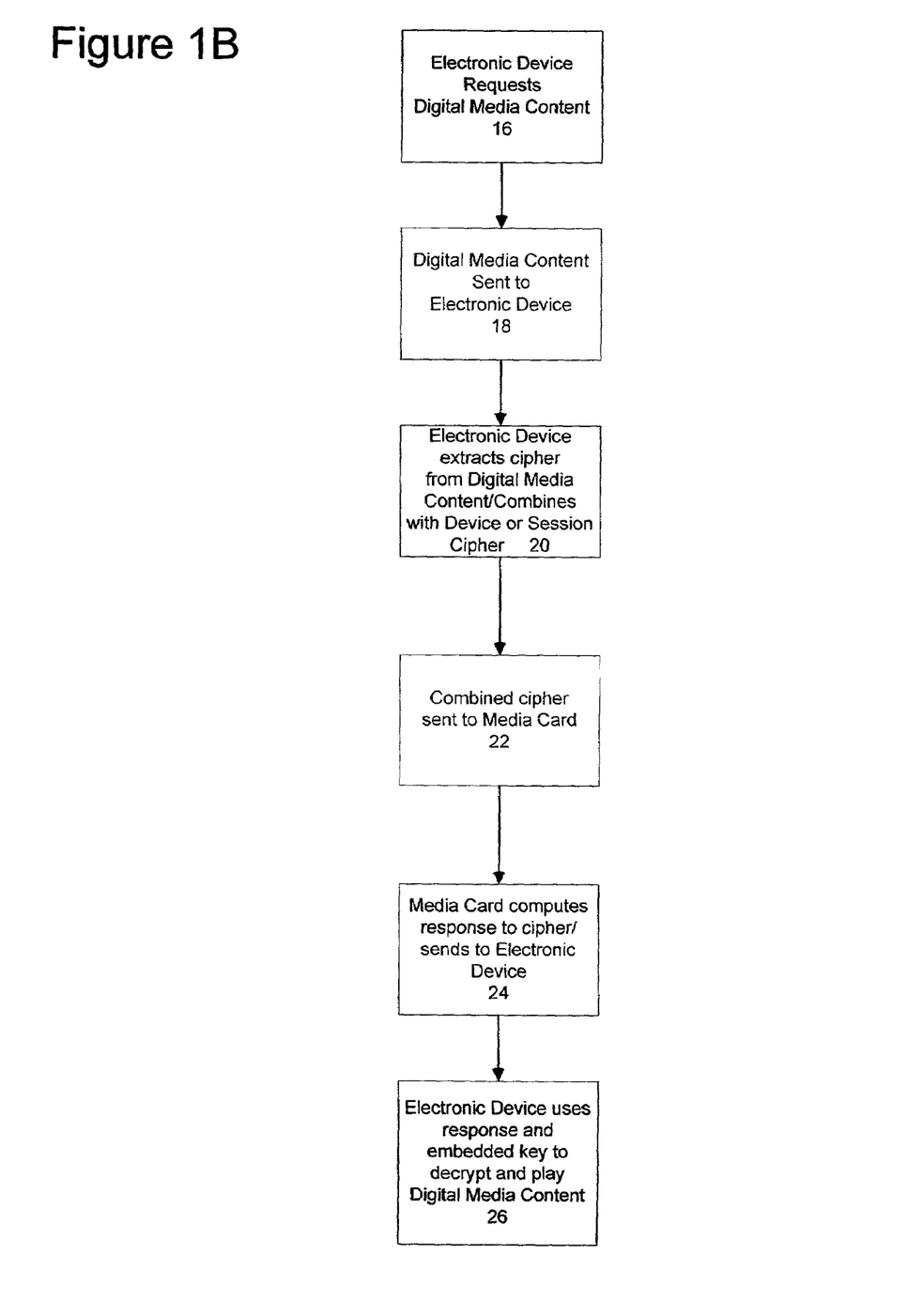
FIG. 1B is a flow chart showing an overview of the steps involved in transferring digital media content to the user in the embodiment of FIG. 1A.

FIG. 1B depicts the sequence of events that take place following the insertion of a media card 14 in the smart card reader 12. The electronic device 10, which is connected to the smart card reader 12, requests the digital media content 2, such as a movie, be downloaded to it over the network 8 (step 16). The server 6 containing the storage medium 4 and the digital media content 2 sends the digital media content to the electronic device 10 over the network 8 upon receiving a request (step 18) from the electronic device. The digital media content delivery may be in response to an HTTP request, or the delivery may be the result of a CGI script or servlet executing on the server. The electronic device 10 extracts a cipher from the digital media content 2 and combines the cipher with a cipher produced by the electronic device 10 or from the current device session (step 20). The combined cipher is sent to the media card 14 (step 22). The media card 14 calculates the correct response to the cipher and transmits the solution to the electronic device 10 (step 24). The electronic device 10 uses the solution and an embedded key to decrypt and play the digital media content 2 (step 26). Once the digital media content 2 has been decrypted, the electronic device 10 may present the digital media content to a user of the electronic device in any form that the electronic device is capable of presenting to a user.

Figure 2A:
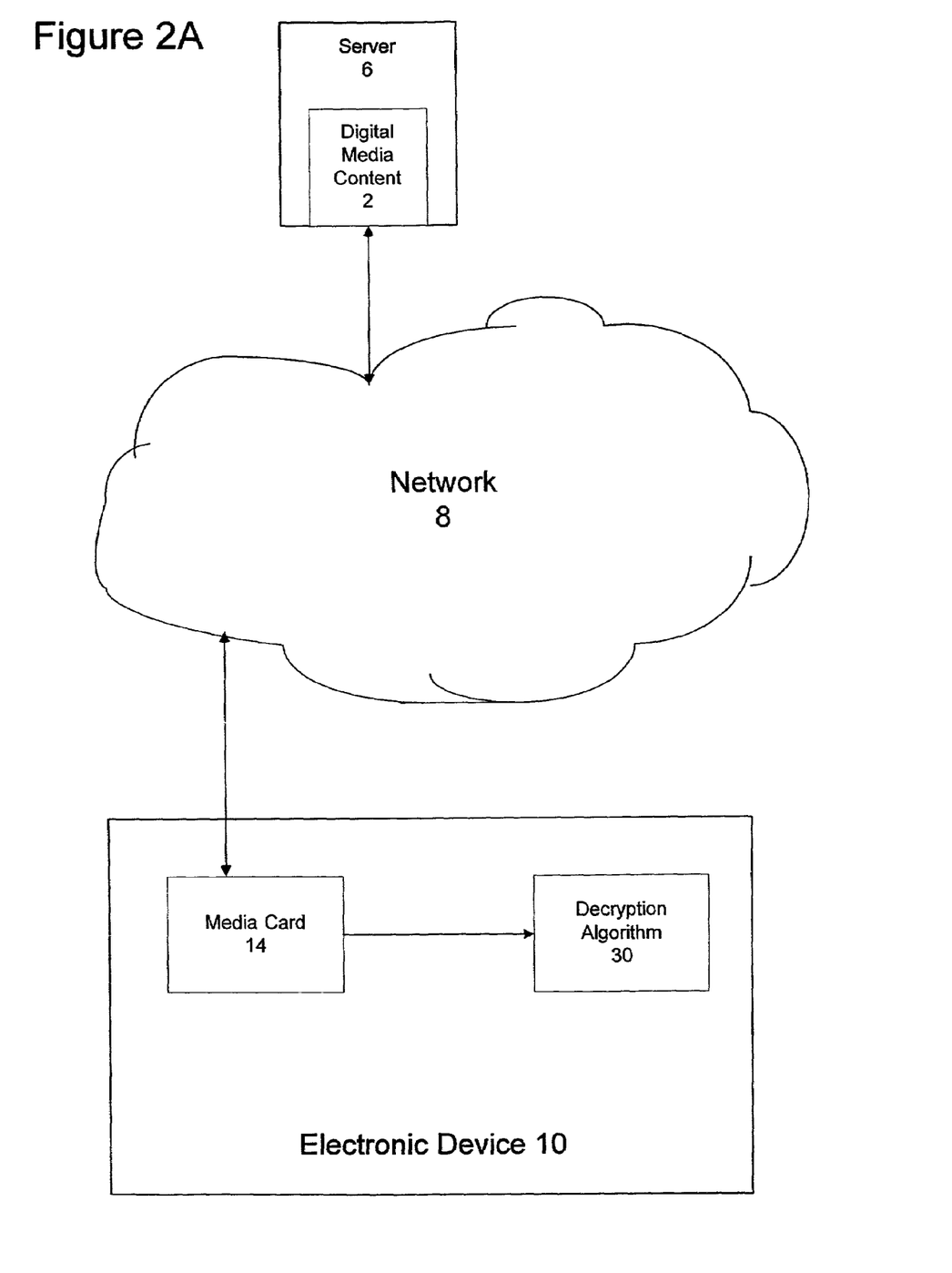
FIG. 2A is a block diagram depicting a network environment suitable for practicing a separate embodiment of the present invention utilizing one smart card and a decryption algorithm.

In an alternative embodiment depicted in FIG. 2A, the media card and a decryption algorithm are used to decrypt the digital media content 2 which is delivered over a network 8 from a server 6 to an electronic device 10. The media card 14 is connected to the electronic device 10. The electronic device 10 also contains a decryption algorithm which is used in combination with the media card 14 to decrypt the the digital media content 2.

Figure 2B:
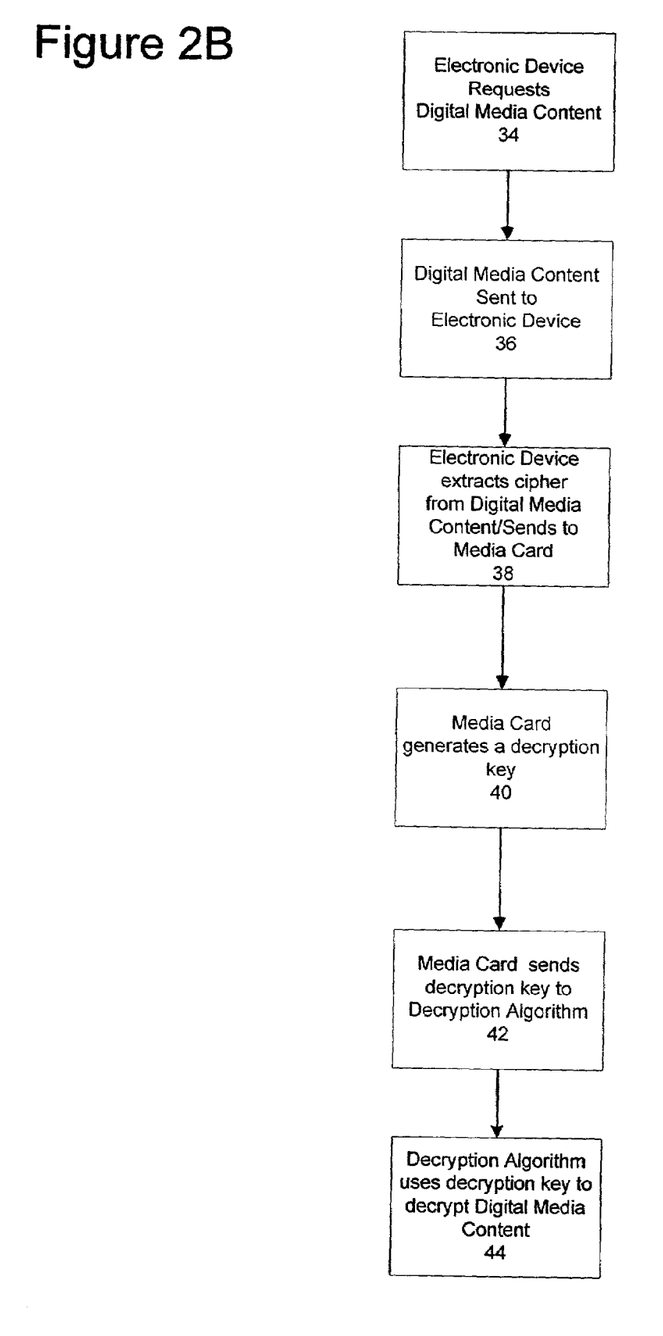
FIG. 2B is a flow chart showing an overview of the steps involved in transferring digital media content to the user in the embodiment of FIG. 2A.

The sequence of steps followed by the alternative embodiment is listed in FIG. 2B. The electronic device 10 sends a request for digital media content 2 to the remote server 6 (step 34). The server 6 sends the digital media content 2 to the electronic device 10 over the network 8 (step 36). The electronic device extracts a cipher from the digital media content 2 and sends it to the media card 14 (step 38). The media card 14 generates a decryption key (step 40) and sends the decryption key to the decryption algorithm 30 located in the electronic device 10 (step 42). The decryption algorithm 30 uses the decryption key to decrypt the digital media content 2 which may then be presented to a user.

Those skilled in the art will recognize that the process of encrypting/decrypting the digital media content 2 may be accomplished in a number of different ways. The decryption key may be dynamically generated using a multiplier, such as the day of the month. Alternatively, the decryption key may be a fixed decryption method that uses a dynamic offset, such as the day of the month, which is added to a fixed index. The data may be encoded as single bits, groups of bits, or in combinations of single and grouped bits. The illustrative embodiments of the present invention do not depend upon any one particular encryption/decryption method.

Figure 3A:
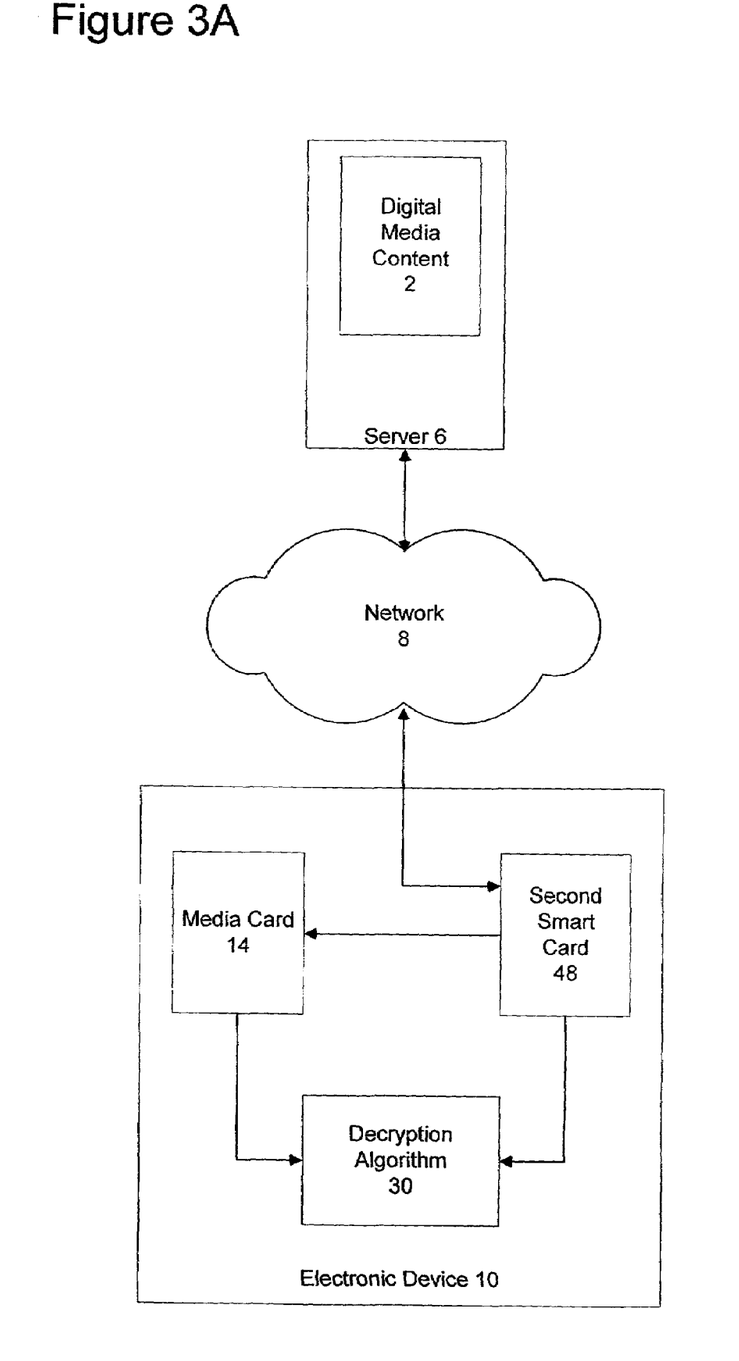
FIG. 3A is a block diagram depicting a network environment suitable for practicing a separate embodiment of the present invention utilizing 2 smart cards connected to one another.

In a separate embodiment depicted in FIG. 3A, two smart cards are used, the media card 14 and a second smart card 48, both of which connect to the electronic device 10. The electronic device 10 also contains a decryption algorithm 30 which is used in the decryption of the digital media content. A server 6 which holds digital media content 2 is also connected to the electronic device 10 through a network 8.

Figure 3B:
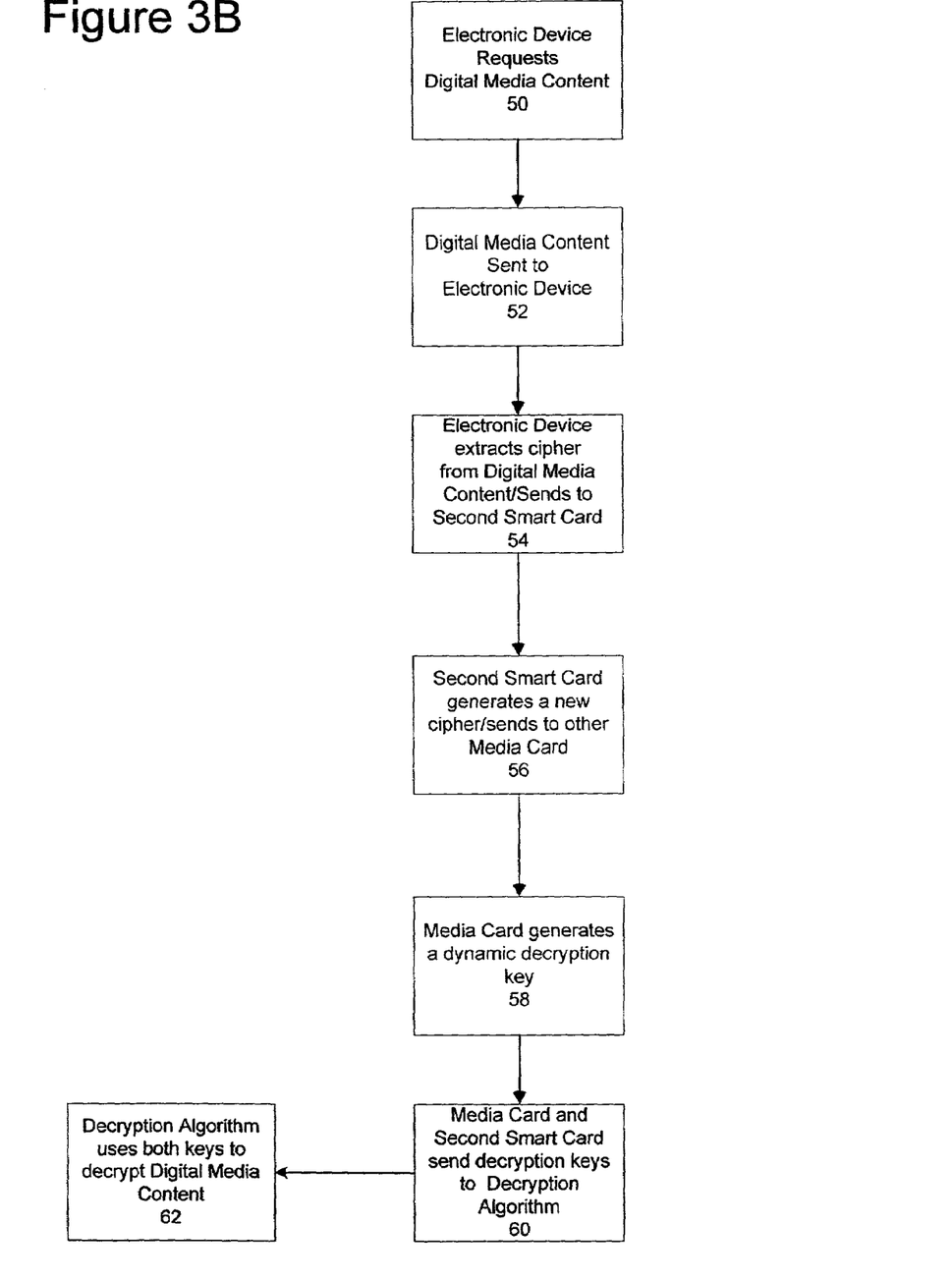
FIG. 3B is a flow chart showing an overview of the steps involved in transferring digital media content to the user in the embodiment of FIG. 2A.

The sequence of steps followed by the embodiment depicted in FIG. 3A is listed in FIG. 3B. The electronic device 10 sends a request for digital media content 2 to the remote server 6 (step 50). The server 6 sends the digital media content 2 to the electronic device 10 over the network 8 (step 52). The electronic device extracts a cipher from the digital media content 2 and sends it to a second smart card 48 (step 54). The second smart card 48 generates a new cipher and sends it to the media card 14 (step 56). The media card 14 generates a dynamic decryption key (step 58). Both the media card 14 and the second smart card 48 send decryption keys to the decryption algorithm 30 stored on the electronic device 10 (step 60). The decryption algorithm 30 uses the decryption keys to decrypt the digital media content 2 (step 62). The electronic device 10 may then present the digital media content 2 to a user.

Figure 4A:
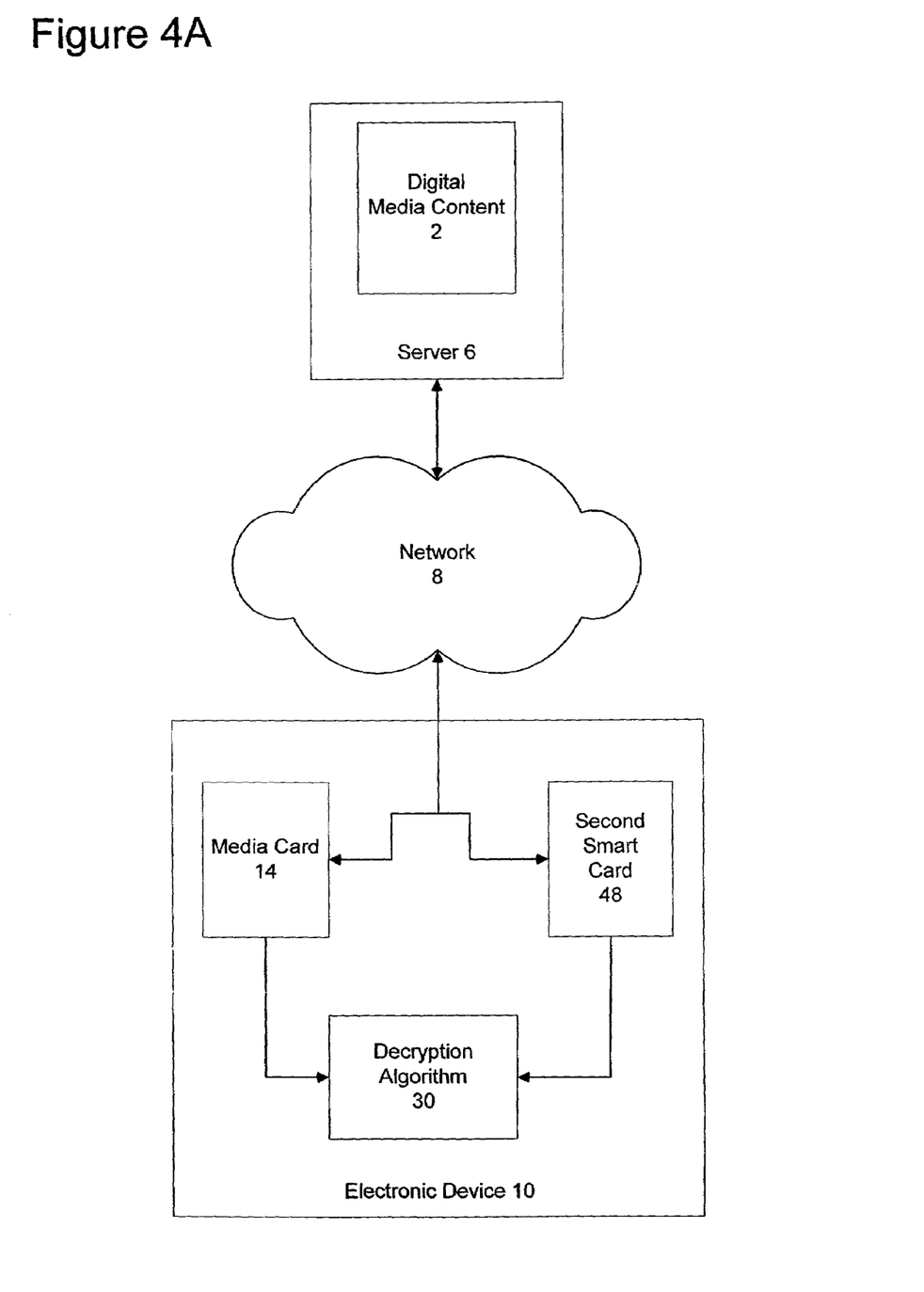
FIG. 4A is a block diagram depicting a network environment suitable for practicing a different embodiment of the present invention utilizing 2 smart cards not connected to each other.

In a different embodiment depicted in FIG. 4A, two smart cards are used, the media card 14 and a second smart card 48, both of which connect to the electronic device 10 but do not transmit data to each other. The electronic device 10 also contains a decryption algorithm 30 which is used in the decryption of the digital media content. A server 6 which holds digital media content 2 is also connected to the electronic device 10 through a network 8 connection.

Figure 4B:
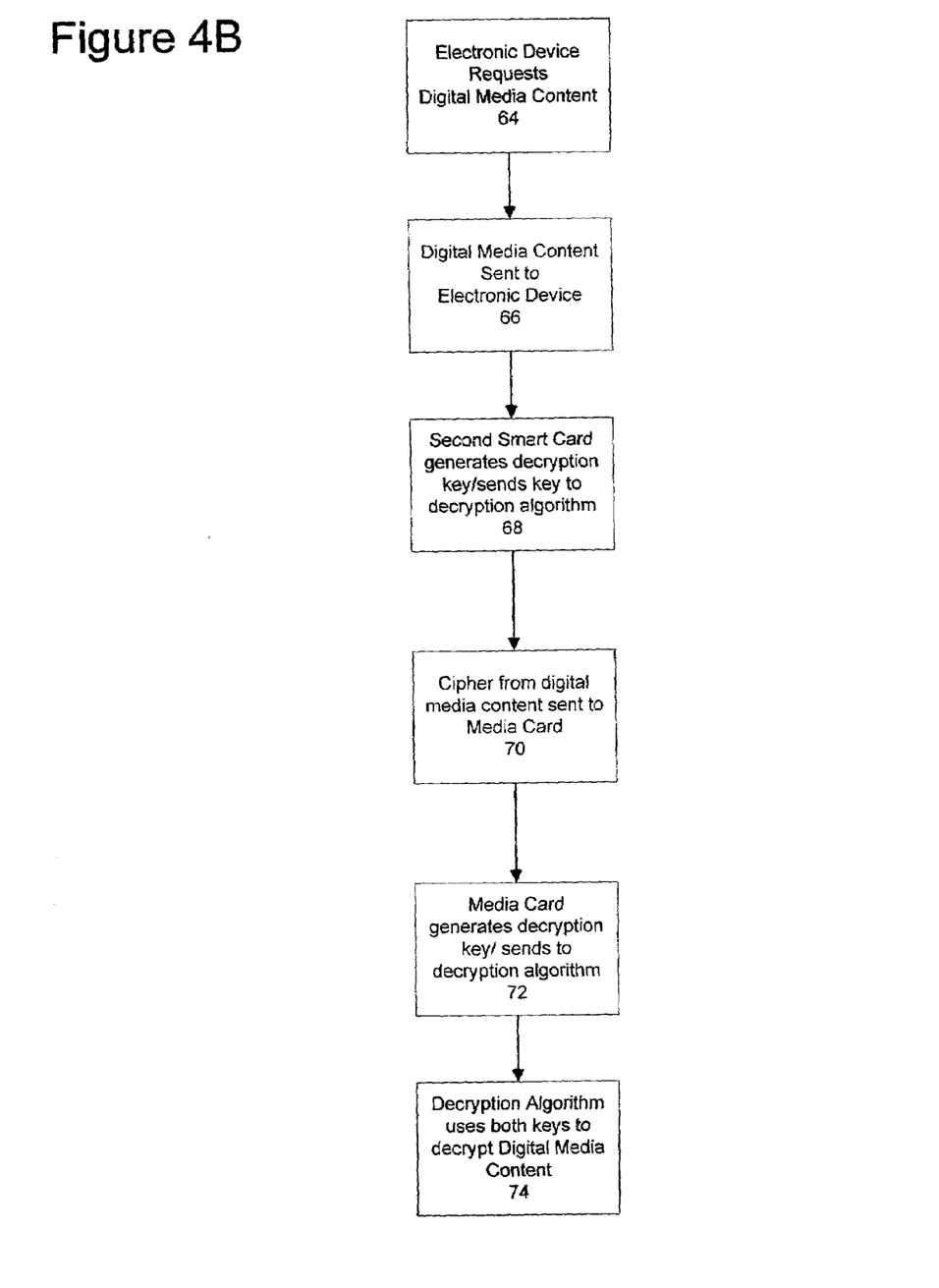
FIG. 4B is a flow chart showing an overview of the steps involved in transferring digital media content to the user in the embodiment of FIG. 3A.

The sequence of steps followed by the embodiment of FIG. 4A is shown in FIG. 4B. The electronic device 10 sends a request for digital media content 2 to the remote server 6 (step 64). The server 6 sends the digital media content 2 to the electronic device 10 over the network 8 (step 66). The second smart card 48 generates a decryption key and sends it to the decryption algorithm 30 stored on the electronic device 10 (step 68). The electronic device 10 extracts a cipher from the digital media content 2 and sends it to the media card 14 (step 70). The media card 14 generates a decryption key and sends it to the decryption algorithm 30 (step 72). The decryption algorithm 30 uses the decryption keys to decrypt the digital media content 2 (step 74). The electronic device 10 may then present the digital media content 2 to a user.

The illustrative embodiment of the present invention allows an end user who has purchased the media card 14 containing the license and decryption key to transfer the media card either by selling it or lending it to other people. This ability to transfer the physical item of the media card 14 while still retaining the distribution system of downloading digital media content 2 over the Internet addresses copyright concerns and greatly increases the efficiency of distribution on the part of the digital media content supplier. The illustrative embodiment ensures that the party receiving the digital media content 2 is likely authorized to receive the digital media content. The tangible presence of the media card 14 allows the license to be purchased and sold as a product by retailers to consumers.

It will thus be seen that the invention efficiently attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the network configurations depicted and described herein are really examples of the multiple possible network configurations that fall within the scope of the current invention.

We claim:

1. A method for delivering digital media content, said method for use with a network, said network interfaced with a storage medium containing digital media content and further interfaced with an electronic device, said electronic device interfaced with a first smart card and second smart card, said method comprising the steps of:

sending a request for said digital media content over said network from said electronic device;

receiving a stream of said digital media content in encrypted form from said medium with said electronic device, said encrypted digital media content being stored on said electronic device;

extracting a cipher from said digital media content and sending said cipher to said second smart card;

generating a new cipher with said second smart card and sending said new cipher from said second smart card to said first smart card, said first smart card equipped with a license for said digital media content;

obtaining a first decryption key in response to said new cipher using said first smart card, said decryption key being transmitted from said first smart card to said electronic device;

obtaining a second decryption key using said second smart card, said second decryption key being transmitted from said second smart card to said electronic device; and using said first and second decryption keys and a decryption algorithm located on said electronic device to decrypt said digital media content stored on said electronic device.

2. The method of claim 1, said method comprising the further step of:

presenting said digital media content to said user.

3. The method of claim 1 further comprising the steps of:

denoting as a reference point on said smart card a place in the stream of digital media content being presented to a user where said user stops receiving a group of digital media content.

4. The method of claim 1 comprising the steps of:

denoting as reference points on said smart cad each place in a stream of digital media content where each one of a plurality of users has stopped receiving a group of digital media content.

* * * * *